Jan. 18, 1955 G. L. OMON ET AL 2,699,961
TENSION RELEASABLE COUPLING
Filed Nov. 26, 1948 2 Sheets-Sheet 1
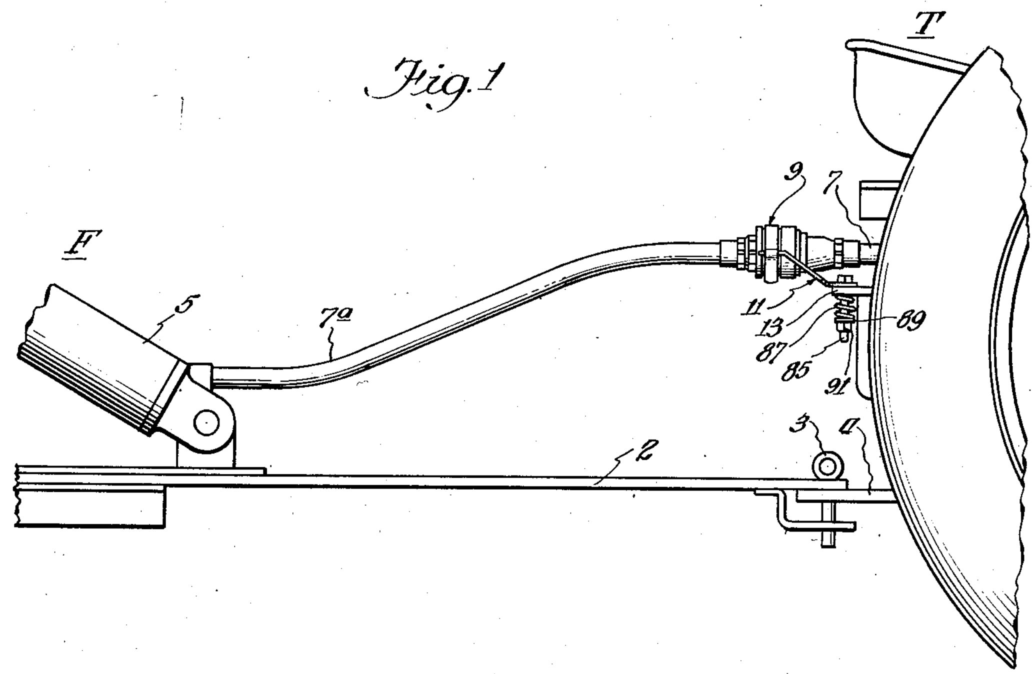
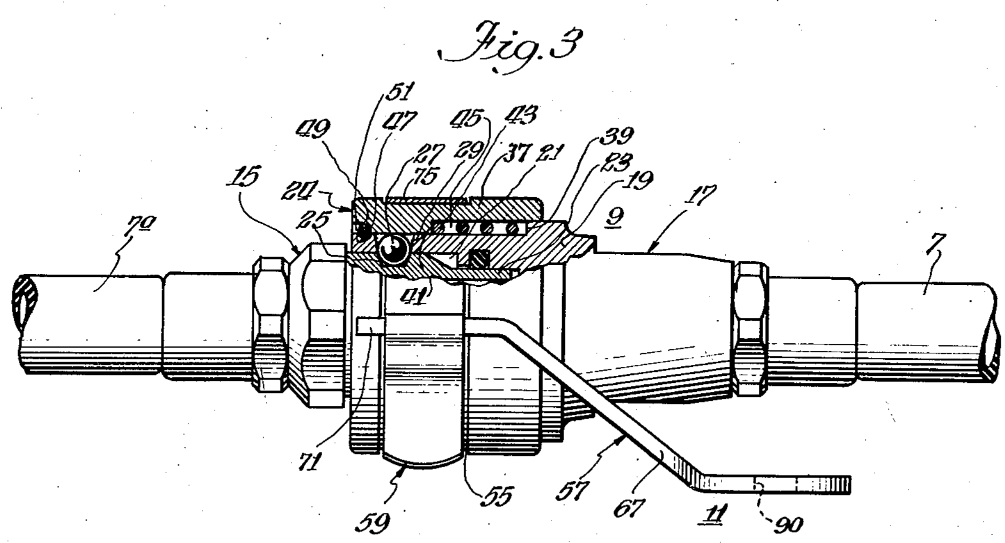
Inventors:
Gene L. Omon
Kurt E. Hohnl
By: Soans, Pond and Anderson
Atty's.

TENSION RELEASABLE COUPLING
Filed Nov. 26, 1948 2 Sheets-Sheet 2
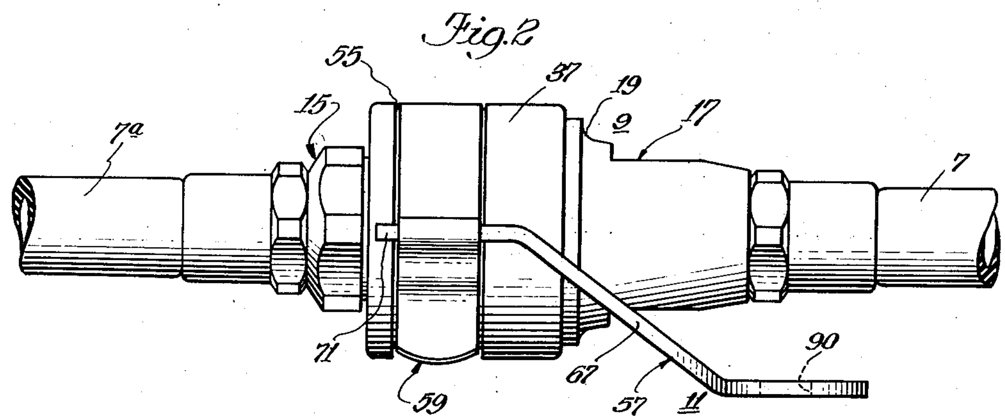
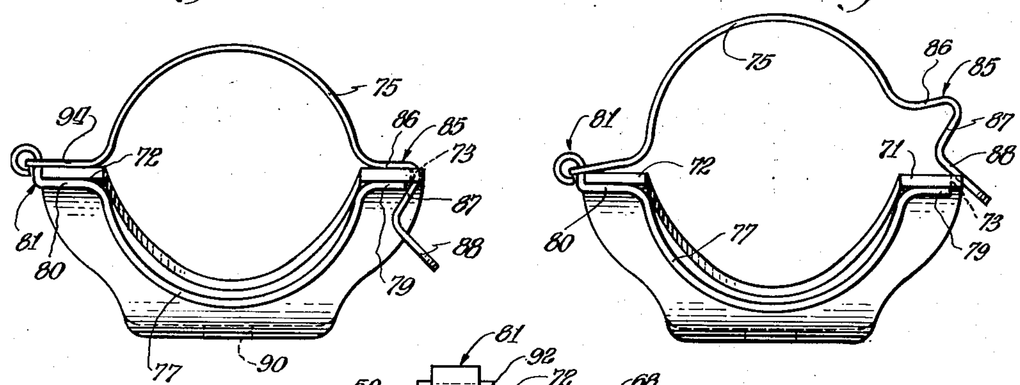
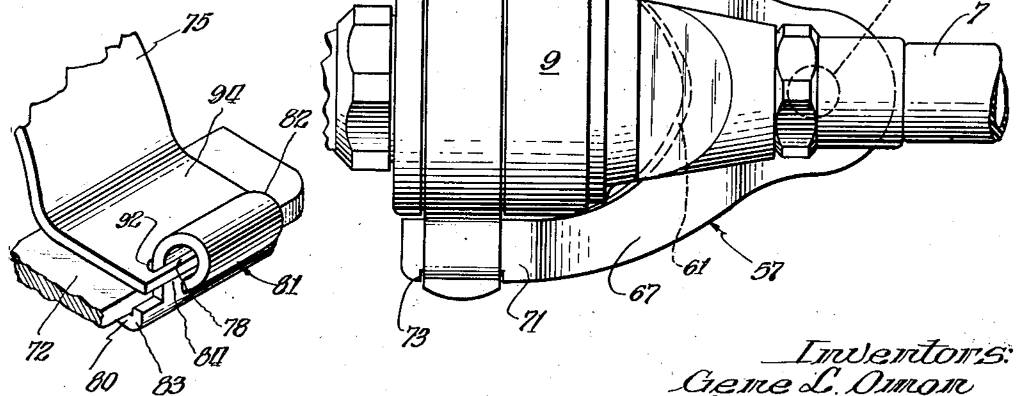
Inventors:
Gene L. Omon
Kurt E. Hohnl
By: Soans, Pond and Anderson
Atty's United States Patent Office 2,699,961

Patented Jan. 18, 1955

2,699,961

TENSION RELEASABLE COUPLING

Gene L. Omon and Kurt E. Hohnl, Milwaukee, Wis., assignors to J. I. Case Company, Racine, Wis., a corporation of Wisconsin Application November 26, 1948, Serial No. 62,202

1 Claim. (Cl. 285—168)

The present invention relates, in general, to interconnected fluid systems and, in particular, to means for coupling a pair of fluid or hydraulic conduits in a manner such that excessive stresses upon the conduits will be operable to automatically separate them one from the other.

In fluid operated systems which include conduits which are interconnected by couplings, the conduits may be subjected to various stresses incident to the operation of the associated systems. This particularly occurs in the case of systems which are interconnected by flexible conduits or hoses, since such conduits are usually relatively weak in a longitudinal direction and excessive longitudinal strains tend to damage the conduit. Therefore, it is desirable to interconnect flexible conduits in such a manner that a strain of a predetermined amount upon one of the conduits will be operable to cause them to separate from each other thereby obviating damage which might occur if a greater strain were applied.

When the flexible hoses are interconnected by means of a coupling which is manually disconnectable, as for example, a coupling of the type shown in our copending application, Serial No. 56,824, which was filed on October 27, 1948, and which was assigned to the assignee of the present invention, now Patent 2,665,928, issued January 12, 1954, the problem of providing for the separation of the hoses from each other is of prime importance since couplings of this type positively lock the conduits together. The locking action of a coupling of this type is wholly unaffected by longitudinal stresses which may be exerted on the conduits associated with the coupling members, and an excessive longitudinal pulling force may result in a broken or damaged coupling or fluid conduit thereby causing a substantial interruption in the operation of the associated systems.

Excessive longitudinal strains on the hydraulic conduits frequently occur when coupled fluid systems are disposed in separate vehicles, as for example, when a hydraulic pump on one vehicle is adapted to actuate a hydraulic device on a second vehicle which is adapted to be drawn by the first vehicle. In the event that the draft or mechanical connection between the vehicles become disconnected without the concurrent separation of the hydraulic systems, the attendant or succeeding moving apart of the vehicles exerts a strain upon the fluid conduits connecting the systems, thereby resulting in the above mentioned damage to the conduits and to the couplings. This situation may arise frequently in connection with the operation of tractor drawn and controlled farm implements where the implement may become mechanically uncoupled through the inadvertence of the operator, due to the operation of the implement in a rough field, or in the event that the drawn implement encounters an obstruction in the field.

The principal object of the present invention, therefore, is to provide means for coupling a pair of fluid or hydraulic conduits which will be operable to automatically separate the conduits in the event that excessive longitudinal strains are exerted thereupon. Other objects of the present invention include provision of means for coupling a pair of fluid conduits which will be simple in operation, relatively inexpensive to manufacture and automatically operable to prevent damage to the fluid conduits associated therewith. A more specific object of the invention is the provision of a supporting bracket for a hydraulic coupling having locking means of the type described in our above mentioned co-pending application, and the provision of means for mounting the bracket in a manner such that excessive longitudinal strains upon the hydraulic hoses associated with the coupling will be operable so as to cause the automatic separation of the coupling. These and other objects and advantages of the invention will be made apparent by reference to the accompanying drawings and succeeding description of an embodiment thereof.

In the drawings:

Fig. 1 is a fragmentary, side elevational view showing the rearward end of a tractor having an associated hydraulic system, and the forward end of a farm implement having a hydraulically actuated device associated therewith. The implement is shown mechanically interconnected with the tractor for draft purposes and hydraulically interconnected with the tractor in accordance with the present invention;

Fig. 2 is a side, elevational view of a supporting bracket with a hydraulic coupling mounted therein;

Fig. 3 is a view similar to Fig. 2 showing parts of the hydraulic coupling broken-away;

Figs. 4 and 5 are rear, elevational views of the supporting bracket illustrated in Figs. 2 and 3, showing the means employed for engaging the associated hydraulic coupling;

Fig. 6 is a plan view of the supporting bracket and coupling shown in Fig. 2; and Fig. 7 is a fragmentary perspective view of a portion of the supporting bracket.

The means for coupling a pair of fluid conduits may become a part of any fluid system or systems which include a pair of interconnected fluid conduits. However, the means for coupling is particularly adapted for interconnected fluid systems, the conduits of which may be accidentally or designedly subjected to abnormal, longitudinal pulling stresses in the course of operation. As hereinbefore noted, this not infrequently occurs in tractor-implement farm operations. Accordingly, for purposes of illustration, the means for coupling a pair of fluid conduits is shown with relation to a tractor-implement combination.

In particular, Fig. 1 shows a standard or conventional tractor T having an auxiliary hydraulic system supported thereon which includes a hydraulic pump (not shown), the tractor T being mechanically coupled to a farm implement F by a connecting member or draft bar 2. The draft bar 2 is pivotally attached to the tractor T through the use of a hitch pin 3 which interconnects the draft bar 2 with a drawbar 4 which is provided on the rearward end of the tractor T. The implement F supports a hydraulic system which includes a hydraulically operated device such as the hydraulic ram 5 which is adapted to actuate and to control the mechanical adjustment of the implement F. The hydraulic systems disposed in the separate vehicles are interconnected by means of conduits 7 and **7*a* which extend between the separate hydraulic systems, conduit 7 being associated with the tractor T and conduit 7*a* being associated with the implement F. The fluid conduits 7 and 7*a* are coupled by a coupling 9 which includes locking means in accordance with that described in our aforesaid co-pending application Serial No. 56,824. The coupling 9 is cradled within a supporting bracket 11 which is resiliently attached to and supported on a generally horizontal frame member 13 of the tractor. The coupling 9 and the bracket 11 are interconnected and supported upon the tractor T in a manner such that a strain upon the hydraulic conduits will automatically cause the coupling to unlock thereby permitting the conduits 7 and 7*a*** to separate in accordance with the invention.

The hydraulic break-away coupling illustrated is of the self-sealing, break away type and includes a male connecting member 15 and a female connecting member 17 which are adapted to be releasably interconnected with one another. In order to accomplish the interconnection of the coupling members, the female connecting member 17 is provided with a housing 19 having a socket-like portion 21 formed in the outer or rearward end thereof with respect to the tractor T, and the male connecting member is provided with a generally tubular portion 23 proportioned to fit within the socket-like portion 21 of the female connecting member 17. The releasable engagement of the coupling members is accomplished by providing the female connecting member 17 with a locking means 24 adapted to engage and lock with a detent or groove 25 which extends circumferentially around the tubular portion 23 of the male connecting member 15 which is disposed within the socket-like portion 21 of the female connecting member 17 when the coupling members are interconnected.

The locking means 24 which forms a part of the female connecting member 17 includes a plurality of circumferentially disposed, spaced-apart, locking balls 27 which are supported at the rearward end of the socket-like portion 21 of the female connecting member 17 and which are adapted to be moved radially into and out of engagement with the groove 25 provided on the male connecting member 15, thus providing means for interlocking the individual coupling members. The radial movement of the balls 27 is guided by the apertures 29 which are disposed around the periphery of the socket-like portion 21 and extend through the housing 19. The apertures 29 are generally frustro conical in shape and the walls of the aperture taper outwardly from a diameter which is slightly less than that of the locking balls 27. This construction restricts or limits the inward movement of the balls 27 to an amount sufficient to engage the circumferential groove 25 provided in the male connecting member 15 and prevents the balls 27 from falling out of the apertures 29 when the male connecting member 15 is disengaged from the female connecting member 17.

The balls 27 are maintained in their innermost or locking position by a spring biased sliding sleeve 37. This sleeve is slidably supported on the rearward end of the housing 19 which forms a part of the female connecting member, for longitudinal movement. The housing 19 is provided with a ridge 39 which extends around the outer surface of the housing and which is disposed forwardly of the ball apertures 29. The forward, inner diameter of the sliding sleeve 37 approximates that of the ridge 39, and the inner diameter of the rearward portion of the sleeve 37 approximates that of the rearward end of the housing 19 which is less than that of the ridge 39. This change of diameter on the inner surface of the sleeve 37 is accomplished by providing a step 41 approximately in the center of the inner surface, this step serving as a bearing surface for a biasing spring 43. The spring 43 extends between the step 41 and a ridge 39 which is provided on the housing 19 and which provides a bearing surface for the forward end of the spring 43. Thus, the spring 43 is disposed in an annular space 45, Fig. 3, and is free to bias the longitudinally sliding sleeve in a rearwardly direction along the female connecting member 17.

The rearward movement of the spring biased sliding sleeve 37 is limited by a ring 47 of resilient material which is fitted into a groove 49 formed on the outer surface adjacent the rearward end of the housing 19. The sliding sleeve bears against this resilient ring along an undercut surface 51 which is formed on the rearward end of the sleeve 37. This bearing surface 51 is formed so as to exert only compressive forces on the groove-seated resilient ring 47. The undercut surface 51 also permits the locking balls 27 to move radially outward in the ball apertures 29 into their unlocking or release position when the spring biased sliding sleeve 37 is moved longitudinally forwardly. When the sleeve is released, the undercut portion 51 of the sliding sleeve 37 acts as a cam surface which serves to force the locking balls 27 back into the apertures 29 and into engagement with the sides of the aperture 29. When the locking balls 27 are disposed in their innermost position, they extend into the socket-like portion 21 (Fig. 3) to engage the groove 25 formed in the male connecting member 15. The groove 25 is positioned and proportioned to register with the locking balls 27 when the coupling members are interconnected. Thus, through the longitudinal forward movement of the spring biased, sliding sleeve 37, the male connecting member 15 is freed and easily withdrawn from the female connecting member 17 while if the sliding sleeve 37 is in its rearward or normal position, it is adapted to securely interengage and interlock the connecting members.

The locking mechanism of the class described gives particularly good results but it will be understood that other similar mechanisms operable through longitudinal, relative movement of a sliding sleeve or the like are in accord with the present invention and are intended to be within the appended claims.

The spring biased sleeve 37, illustrated particularly in Figs. 2 and 3, has a channel-shaped groove 55 formed on its outer surface, which extends circumferentially around the sleeve 37. The coupling 9 is adapted to be supported in and engaged by a portion of the supporting bracket 11 which fits within the groove 55. Thus, the sliding sleeve 37 is maintained in a fixed or constant relation with respect to the bracket 11.

In a coupled hydraulic system in accordance with the invention the coupling 9 is supported upon the tractor T in a bracket 11 which is adapted to engage the groove 55 in the sliding sleeve 37. The bracket 11 is proportioned so that it does not interfere with relative longitudinal movement between the sleeve 37 and the housing 19 of the female connecting member of the coupling 9. The supporting bracket 11, illustrated in the drawings, includes a bifurcated supporting element 57 which is adapted to be supported on the frame member 13 of the tractor T and a coupling engaging portion or clamping section 59 which is adapted to engage the groove 55 on the sleeve 37. The bifurcated supporting element 57 is fabricated from sheet material and is adapted to be attached at its forward end to the frame 13 of the tractor T by resilient means which will hereinafter be described. The rearward end of the element 57 is bifurcated to provide a pair of spaced-apart arms 67 and 68 which are adapted to extend around the coupling 9 (Figs. 2 and 6). The arms 67 and 68 extend upwardly and rearwardly, and a generally U-shaped portion 61 is cut away to insure that the coupling 9 does not come in contact with the supporting element 57. The rearward ends of the arms 67 and 68 are disposed in a common, horizontal plane to provide a pair of clamp supporting sections 71 and 72 as illustrated in Figs. 2 and 6. The outer edge of the clamp supporting section 71 is provided with an indentation or notch 73 adjacent the forward end thereof. The indentation 73 is generally channel-shaped and is proportioned to accommodate a portion of the clamping section 59.

As has been pointed out, the clamping section 59 is adapted to engage the groove 55 provided on the coupling 9 and, accordingly, in the illustrated embodiment, the clamping section 59 is of annular shape. The clamping section 59 includes an upper-half section or segment 75 and a lower-half section or segment 77, each of which is generally semi-circular in form. The two half sections are adapted to be interconnected by a hinged connection 81 at one side and a clamp connection 85 at the other side.

The lower segment 77 is provided with a pair of flanged portions 79 and 80 which are disposed outwardly of the semi-circular segment 77 and which are adapted to be fixedly attached to the supporting sections 71 and 72. Flanged portion 79 is attached to the lower face of supporting section 71 inwardly of the indentation 73 provided therein, and the flanged portion 80 is fixedly attached to the lower face of the supporting section 72. The flanged portion 80 is bent upwardly around the outer edge of the supporting section 72 to provide a shoulder 83 which engages the outer end of that section. A narrow strip 84 of the material from which the segment 77 is fabricated extends upwardly from the shoulder 83 and is curved outwardly upon itself to provide a hinge ring 82 which constitutes a part of the hinge 81.

The upper segment 75 is disposed above the lower segment 77 and is adapted to be hingedly attached to the hinge ring 82 and to releasably engage the indentation 73 formed on the arm 67 of the supporting element 57. The hinged connection to the hinge ring 82 is made possible by fabricating a portion of the segment in a manner such as to form a hinge pin 78, and the releasable connection is effected by forming a portion of the segment 75 in a manner such that it constitutes a clamping section 85.

To provide the hinge pin 78, one end of the upper segment 75 is bent outwardly to provide a flange 94, and an elongated aperture 92 is formed at the outer end of the flange 94. The portion of the upper segment 75 which is disposed between the outer end of the flange 94 and the outer edge of the aperture 92 constitutes the hinge pin 78. The aperture 92 is proportioned to receive the narrow strip of material 84 from which the hinge ring 82 is formed. In order to provide for the detachment of the upper segment 77 from the lower segment 75, the hinge ring is not completely closed as illustrated in the drawings.

The clip 85 on the upper segment 75 is particularly shown in Figs. 4 and 5. The strip of material from which the clip is fabricated is bent outwardly to form a flanged portion 86 and the material outwardly of the flange 86 is folded downwardly around the indentation 73 to form a locking portion 87. The lower part of the locking portion 87 is bent outwardly to form a handle or tab 88. The bends in the strip are arranged so that the locking portion 87 of the clip 85 extends a sufficient distance inwardly of the indentation 73 to cause the clip 85 to lock in engagement with the indentation 73 when the other end of the segment 75 is hingedly connected to the lower segment 77.

When the coupling 9 is engaged with the supporting bracket 11, the clamping segments 75 and 77 fit within the groove 55, and the sliding sleeve 37 is held fixed with respect to the supporting bracket 11. The indentation 73 on the arm 67 of the supporting element 57 and the hinged connection 81 prevent the upper segment 75 and the coupling 9 from slipping longitudinally of the arms 67 and 68.

The supporting bracket 11 is adapted to be resiliently supported on the support member 13 on the tractor T as hereinbefore noted. This is accomplished by providing the forward end of the supporting element 57 with an aperture 90, and a bolt 85 is inserted through the aperture 90 and through a hole provided in a supporting member 13. A spring 87 is disposed around the bolt 85 between the supporting member 13 and a washer 89 which is held at the bottom end of the bolt 85 by a nut 91. The resilient support, which has been described, will absorb a large proportion of the shocks incident to the operation of the apparatus and will at the same time provide a limited pivoting of the bracket 11 and coupling 9 about a vertically extending axis defined by the bolt 85.

During use, the tractor T and the associated implement F are mechanically interconnected by the draft bar 2 and the hitch pin 3. The hydraulic conduit 7 on the tractor T is attached to the female connecting member 17 of the coupling and the male connecting member 15 is attached to the hydraulic conduit **7*a* on the implement F. The female member 17 is then clamped in the supporting bracket 11 by means of the upper and lower clamp segments 75 and 77, respectively. The housing 19 of the female member 17 is then moved towards the male connecting member 15 so that the sliding sleeve 37 in effect moves rearwardly along the housing of the female member. The male member 15 is then inserted in the female member 17 and due to the action of the biasing spring 43, the housing 19 returns to its normal position thereby locking the male member 15 in the female member 17**.

In the event that the drawbar 2 becomes disconnected from the tractor T while the implement F is being operated, the longitudinal strain exerted upon the conduit **7*a* will overcome the biasing force of the spring 43 thereby causing the housing 19 of the female connecting member 17 to move rearwardly relative to the tractor T within the clamp 11, this being operable to release the locking balls 27 thereby freeing the male connecting member 15** and automatically separating the two hydraulic systems. It is apparent that through the use of a coupling in accordance with the invention, hydraulic systems which extend between coupled vehicles may be easily and automatically separated without causing damage to either the coupling or its associated conduits.

Supporting brackets which are fabricated in a different manner than that described may be successfully used in carrying out the coupling system of the invention. For example, the upper-half segment of the clamping ring may be hinged to the lower half section in a manner other than that described and various other types of clips may be used. Further, the shape of the supporting element is not critical but the element which has been described has proven satisfactory in use, especially when used in connection with a resilient support which permits pivoting action.

In the illustrated embodiment, the clamp is disposed on the draft vehicle, however, the clamp may be disposed on either vehicle providing the connecting member embodying the locking mechanism is associated with the same vehicle. This is important in order to make a longitudinal strain on the conduit connected to the interlocked connecting member operable to cause the automatic separation of the coupling.

In the foregoing there has been described a means for coupling a pair of fluid conduits such that an excessive longitudinal strain will be operable to cause the automatic separation of the interconnected conduits. The means described embody various novel constructional features whereby automatic disconnection of fluid systems is accomplished under certain operating conditions. The construction of the bracket and especially the hook and clamp arrangement segment makes possible an inexpensive construction and, in addition, makes possible the easy disconnection of the upper clamp segment without danger of losing the clamp.

Various of the features of the invention which are believed to be new are set forth in the appended claim.

We claim:

A coupling including a pair of inner and outer connecting members adapted for telescopic engagement, releasable locking means for maintaining said connecting members in axially fixed, telescopic engagement, said locking means including means defining a plurality of circumferentially aligned recesses in the adjoining surfaces of each of said connecting members, the recesses in the outer member extending therethrough and being disposed for registration with the recesses in the inner member when said connecting members are telescopically engaged, a plurality of ball elements carried by the recesses in said outer member and movable into the recesses in said inner member, means for preventing displacement of said ball elements inwardly of said outer connecting member, means for releasably maintaining said ball elements in a position extending within the recesses in said inner member comprising a sleeve disposed in coaxial, supporting relation to said outer member and affording sliding movement therebetween, biasing means disposed between said outer member and said sleeve to urge said outer member into a position wherein said ball elements are engaged by said sleeve and held in a depressed position to prevent relative axial movement of said inner and outer connecting members, said sleeve element also including means defining a groove along its inner surface which is alignable with the recesses in said connecting members, and a fixed support for said sleeve including an annular shaped clamping means disposed for detachable engagement with said sleeve, said clamping means comprising a pair of generally semi-circular segments seated in an annular groove formed in the outer surface of said sleeve, and a bifurcated supporting element fixedly attached to one of said segments, the other of said segments having one end hingedly connected with said one segment and having the other end thereof releasably attached to said one segment, whereby said sleeve is detachably fixed in position to thereby afford axial movement of said connecting members relative to said sleeve in response to a predetermined longitudinal strain on said coupling, and whereby the recessed portion of said outer connecting member is movable to a position affording movement of said ball elements into the groove on the inner surface of said sleeve to thereby release said inner member for separation from said outer member.

References Cited in the file of this patent

UNITED STATES PATENTS

| | | |
|---|---|---|
| 378,284 | Briscoe | Feb. 21, 1888 |
| 500,230 | Engel | June 27, 1893 |
| 1,579,290 | Elder | Apr. 6, 1926 |
| 2,159,242 | Yanagi | May 23, 1939 |
| 2,286,562 | Merryweather | June 16, 1942 |
| 2,307,427 | Smith | Jan. 5, 1943 |
| 2,377,812 | Scheiwer | June 5, 1945 |
| 2,409,650 | Wiggins | Oct. 22, 1946 |
| 2,417,269 | Robertson | Mar. 11, 1947 |
| 2,533,640 | Ulrich | Dec. 12, 1950 |